(12) United States Patent
Algüera Gallego et al.

(10) Patent No.: US 8,066,298 B2
(45) Date of Patent: Nov. 29, 2011

(54) COUPLING SYSTEM FOR CONNECTING SUPPLY LINES

(75) Inventors: José Manuel Algüera Gallego, Aschaffenburg (DE); Michael Eiermann, Pfungstadt (DE); Martin Richter, Frankfurt (DE); Swen Saupe, Mainz (DE); Achim Strütt, Riedstadt (DE)

(73) Assignee: Jost-Werke GmbH, Neu-Isenburg (DE)

( * ) Notice: Subject to any disclaimer, the term of this patent is extended or adjusted under 35 U.S.C. 154(b) by 488 days.

(21) Appl. No.: 12/226,792

(22) PCT Filed: Apr. 27, 2007

(86) PCT No.: PCT/EP2007/054127
§ 371 (c)(1),
(2), (4) Date: Oct. 28, 2008

(87) PCT Pub. No.: WO2007/125085
PCT Pub. Date: Nov. 8, 2007

(65) Prior Publication Data
US 2009/0096188 A1    Apr. 16, 2009

(30) Foreign Application Priority Data
Apr. 29, 2006 (DE) .......................... 10 2006 020 069

(51) Int. Cl.
*B60D 1/62* (2006.01)
(52) U.S. Cl. ..................... 280/420; 280/416.3; 280/421; 280/422

(58) Field of Classification Search ............... 280/416.3, 280/420, 421, 422, 433, 434, 477, 504
See application file for complete search history.

(56) References Cited

U.S. PATENT DOCUMENTS

| | | | |
|---|---|---|---|
| 3,653,686 A | | 4/1972 | Roesies |
| 3,888,513 A | * | 6/1975 | Pilz et al. ....................... 280/421 |
| 3,941,408 A | * | 3/1976 | Petersson ....................... 280/421 |
| 4,283,072 A | * | 8/1981 | Deloach, Jr. ................... 280/422 |
| 4,624,472 A | * | 11/1986 | Stuart et al. .................... 280/420 |
| 5,000,472 A | * | 3/1991 | Vick, Jr. ......................... 280/420 |
| 5,060,964 A | | 10/1991 | Vick |
| 5,346,239 A | * | 9/1994 | Wohlhuter ..................... 280/420 |
| 5,458,357 A | * | 10/1995 | Wohlhuter ..................... 280/420 |

(Continued)

FOREIGN PATENT DOCUMENTS
DE        41 35 795 A1     5/1993
(Continued)

*Primary Examiner* — Tony H. Winner
*Assistant Examiner* — Marc Scharich
(74) *Attorney, Agent, or Firm* — Hudak, Shunk & Farine Co. LPA

(57) ABSTRACT

A coupling system for connecting supply lines between a trailer and a tractor vehicle, with a socket which is arranged on the tractor vehicle and a support element, having a plug, which is arranged on the trailer. The invention is based on the problem of providing a robustly operating coupling system in which an automatic connection of all of the provided supply lines is possible. The problem is solved by a coupling system in which the socket is arranged in a positionally fixed manner on the tractor vehicle, the plug is guided in a laterally moveable manner in the support element, and the plug can be placed into a connecting position with the socket by an actuator which is arranged on the tractor vehicle.

21 Claims, 2 Drawing Sheets

U.S. PATENT DOCUMENTS

| | | | |
|---|---|---|---|
| 6,481,738 B1 * | 11/2002 | Duncan et al. | 280/422 |
| 6,709,001 B1 * | 3/2004 | Morgan et al. | 280/421 |
| 7,581,746 B2 * | 9/2009 | Abate et al. | 280/422 |
| 7,731,215 B2 * | 6/2010 | Alguera | 280/420 |
| 2009/0008903 A1 * | 1/2009 | Richter et al. | 280/420 |

FOREIGN PATENT DOCUMENTS

| | | |
|---|---|---|
| DE | 198 40 007 A1 | 3/2000 |
| DE | 101 55 056 A1 | 6/2003 |
| EP | 0 816 211 A2 | 1/1998 |
| WO | WO 2005/110836 A1 | 11/2005 |

\* cited by examiner

COUPLING SYSTEM FOR CONNECTING SUPPLY LINES

FIELD OF THE INVENTION

The invention concerns a coupling system for connecting supply lines between a trailer and a tractor vehicle, comprising a socket which is arranged on the tractor vehicle and a support element, having a plug, which is arranged on the trailer.

BACKGROUND OF THE INVENTION

The supply lines, for example, can be provided for the transmission of electric power and/or compressed air, and the trailer can be a semitrailer or any other kind of trailing vehicle.

Coupling systems are known in various configurations. In the most simple case, there is a plug and a socket, which are fastened to more or less elastic lines. After the mechanical connection of trailer and tractor vehicle, it is also necessary to join the supply lines together. For this, a person must connect the plug and socket by hand. Before uncoupling the trailer, the coupling system must again be separated. If one forgets to do so, the coupling system will be torn apart.

Thus, there are efforts under way on the one hand to automate the connecting and separating of coupling systems and on the other hand to make it more safe.

Therefore, in the case of road trains, it was already attempted in the past to lead the supply lines through the kingpin of the trailer, which in the coupled state of trailer and tractor vehicle cooperates with a corresponding mating piece in the fifth wheel. Such a coupling system is described, for example, in EP 0 816 211 A2. However, this device has the drawback that the cross section of the kingpin only allows a limited number of supply lines and, what is more, the kingpin is affected in terms of its strength. Furthermore, there is a high risk of contamination, especially due to lubricating grease and the solids adhering to it, and an increase in the structural height due to the plug being led out below or above the kingpin.

One prior art of this kind is disclosed by DE 101 55 056 A1, whose plug-in coupling system has a wedge-shaped support element with a plug, which is mounted on the kingpin of the trailer so that it can swivel, and located in the entry opening of the fifth wheel when the trailer is coupled up. Then, an actuator with a plug arranged on it extends out from a side wall of the entry opening and makes contact with the plug of the support element. However, this system is arranged in a region of the fifth wheel which already accommodates a number of other structural components, especially the mechanical locking. Therefore, it is only possible to accommodate a small number of contacts in the coupling system, so that, for example, the pressurized air lines still have to be hooked up by hand.

SUMMARY OF THE INVENTION

For this reason, the problem on which the invention is based is to provide a robustly operating coupling system in which an automatic connection of all of the provided supply lines is possible. The problem is solved by means of a coupling system in which the socket is arranged in a positionally fixed manner on the tractor machine, the plug is guided in a laterally moveable manner in the support element, and the plug can be placed into a connecting position with the socket by means of an actuator which is arranged on the tractor vehicle.

After the trailer is coupled up, the actuator arranged on the tractor vehicle moves the plug in the support element until it makes contact with the socket. The primary benefit is that the actuator and the socket do not need to be situated directly in the locking region of the fifth wheel or in the entry mouth of a trailer coupling, but instead in regions with a comparatively large amount of free space. Therefore, the plug and the socket can be designed such in terms of their size and geometry that all supply lines can be accommodated and coupled up in them.

Advantageously, the plug has a ram, with which a pressure rod of the actuator can engage. When the actuator is extended, the pressure rod hits the ram and pushes it laterally in its direction of movement. The plug is likewise moved in the direction of the socket and reaches the socket when the pressure rod is almost fully extended.

Preferably, a locking element is arranged on the plug and/or socket. With this, the plug can be locked after making contact with the socket, so that an unintentional uncoupling of the coupling system is prevented. Another benefit is that the actuator or the pressure rod can be retracted after connecting the plug and socket. This considerably lessens the wear and tear during operation. In the fully retracted position, the actuator or the pressure rod no longer penetrates into the support element, so that there is no danger of breaking off if there should be an unintentional uncoupling of the trailer without first separating the supply lines.

Preferably, the locking element interacts with an unlocking actuator, which should also be arranged on the tractor vehicle. By means of the unlocking actuator, the locking element can be released by remote control. This releasing can be logically interconnected with, for example, the locking position of the mechanical locking system of a fifth wheel, so that the unlocking actuator always releases the locking element whenever the mechanical locking system is opened.

This is especially advantageous when the plug is spring-loaded in the support element and automatically retracts into the support element after releasing the locking element. This has the benefit that no further plug connection exists when the trailer is uncoupled and therefore also the danger of breaking of the plug or socket is eliminated.

The coupling system can be integrated especially preferably in a fifth wheel of a tractor vehicle, which has an entry opening formed by two lateral coupling horns. The support element can be arranged to swivel on a kingpin of the trailer. It has proven to be especially beneficial when the socket can be arranged in the first coupling horn. One of the opposite side walls of the coupling horns is especially suited for this.

The actuator can be arranged in the second coupling horn, opposite the first one. So as not to damage it during the coupling and uncoupling of the trailer, the actuator should be recessed into the side wall of the second coupling horn in its retracted position and not penetrate into the entry opening.

An especially simple construction is achieved when the actuator, the plug and the socket are oriented in the same axis to each other. In this embodiment, all parts relevant to the coupling process lie in the same direction of movement.

Preferably the axis is oriented transversely or at a slant to the direction of travel. The actuator, the plug and the socket can be arranged in the same plane beneath the fifth wheel. In particular, heretofore unused space is available beneath the coupling horns in present-day fifth wheels, which is especially suitable for the installation of the coupling system.

Preferably, the actuator retracts into its original position after producing the connection position and is thus little exposed to wear and tear during driving operation, so that the system is even more robust.

BRIEF DESCRIPTION OF THE DRAWINGS

The invention will now be explained more closely for better comprehension with the help of 2 figures. These show.

DETAILED DESCRIPTION OF THE INVENTION

Figure 1A:
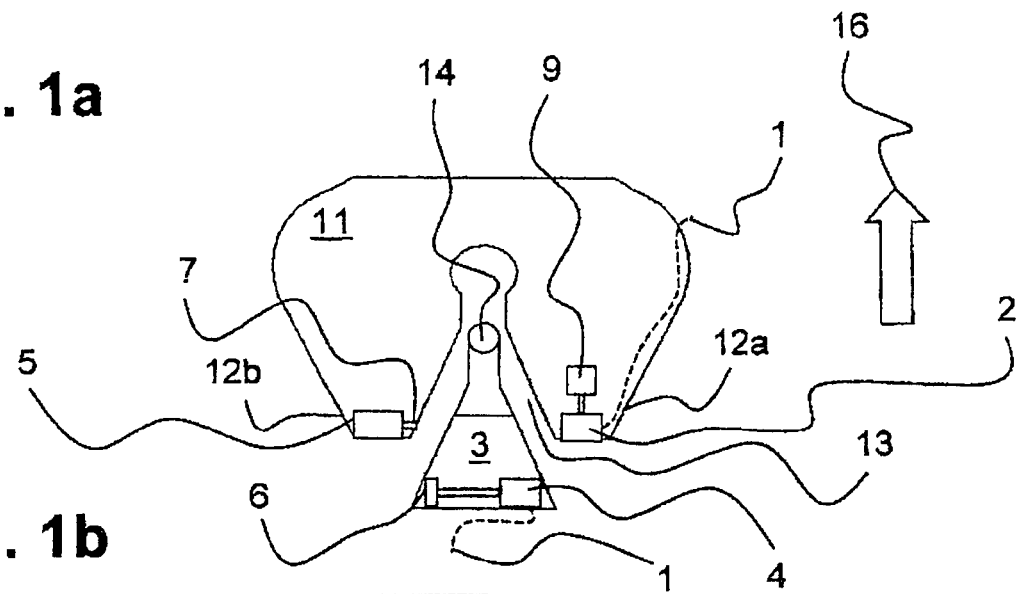
FIG. 1a: a schematic top view of a coupling system according to a first embodiment, arranged on a fifth wheel, before the trailer is coupled up.

FIG. 1 shows a top view of a fifth wheel 11 just prior to coupling up a kingpin 14. During the coupling process, the tractor vehicle (not otherwise shown), which carries the fifth wheel 11, moves in reverse, opposite the direction of travel 16. In order to simplify the introduction of the kingpin 14 into the fifth wheel 11, the fifth wheel 11 has a wedge-shaped entry opening 13 in its rear area, which is bounded on both sides by two coupling horns 12a, 12b.

A support element 3 whose shape is basically adapted to the entry opening 13 is arranged on the kingpin 14 and can swivel. In the coupled condition, the kingpin 14 is locked in the fifth wheel 11, while when the tractor vehicle is driving along curves the support element 3 rotates about the kingpin 14. In a first coupling horn 12a there is located a socket 2, which is connected to a supply line 1. The supply line 1 is shown schematically as a broken line and it contains individual lines for the transmission of electric power, compressed air, and possibly also hydraulic power. One such supply line 1 can also be seen on the trailer. This starts from a plug 4 located in the support element 3 and runs to consumers on the trailer, not shown. The plug 4 itself can move laterally on the support element 3 and is bordered at the side by it. The direction of movement of the plug 4 is oriented, in the embodiment per FIG. 1a to 1c, perpendicularly to the direction of travel.

The second coupling horn 12b has at its end an actuator 5 with a pressure rod 7, which is oriented in a retracted position prior to the coupling up of the trailer and thus does not stand out from the wall of the entry opening 13 facing the coupling horn 12a.

For interaction with the pressure rod 7 of the actuator 5, the plug 4 has a ram 6, which approximately passes through the support element 3.

Figure 1B:
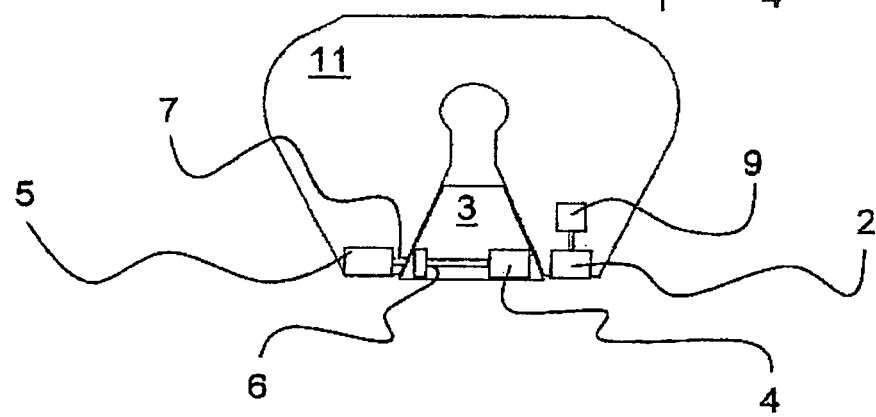
FIG. 1b: a view per FIG. 1a with trailer coupled up, before contacting the coupling system.

FIG. 1b shows a situation with a support element 3 already fully introduced into the fifth wheel 11. The kingpin 14, not shown here (see FIG. 1a), is mechanically joined to the fifth wheel. The pressure rod 7 of the actuator 5 and the ram 6 with the plug 4 have remained unchanged in the starting position, and now the pressure rod 7 and the ram 6 are directly opposite each other.

Figure 1C:
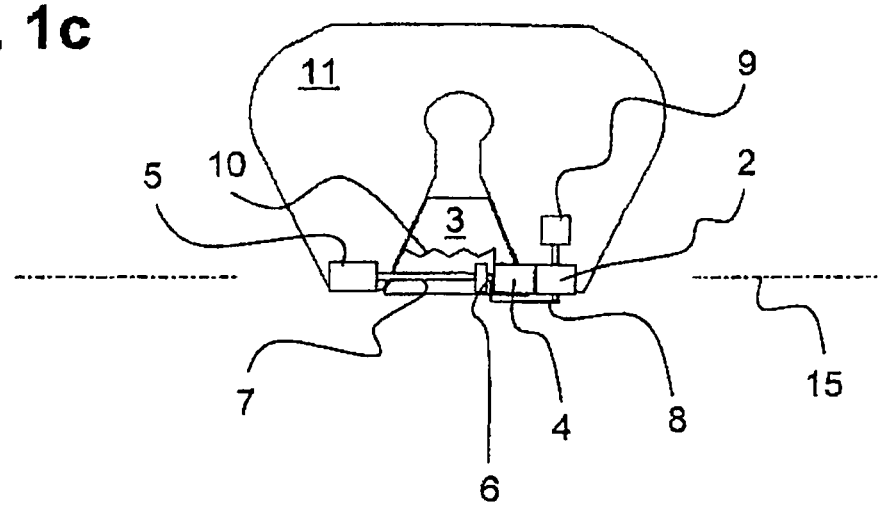
FIG. 1c: a view per FIGS. 1a and 1b with trailer coupled up, after contacting the coupling system.

In FIG. 1c, the plug 4 and the socket 2 are joined together. The pressure rod 7 is entirely extended from the actuator 5 and has thereby shoved the ram 6 and the engaging plug 4 in the direction of the socket 2 and brought it into engagement with the latter. The pressure rod 7, the plug 4 and the socket 2 lie in an axis 15 perpendicular to the direction of travel 16 for this.

After the plug 4 and socket 2 are connected, a locking element 8 reaches underneath the plug 4 and holds it fast. After making the connection, the pressure rod 7 preferably travels back to a protection position inside the coupling horn 12b (see FIG. 1a). To initiate the unhitching process, an unlocking actuator 9 is provided in the coupling horn 12a (see FIG. 1a), which acts on the locking element 8 and releases the plug 4. The triggering of the unlocking actuator 9 can be coupled to the open position of the mechanical locking system of the fifth wheel 11. After a loosening of the locking element 8, the plug 4 retracts by itself into the support element 3. For this, a spring element 10 in the form of a tension spring is provided in the support element 3.

Figure 2A:
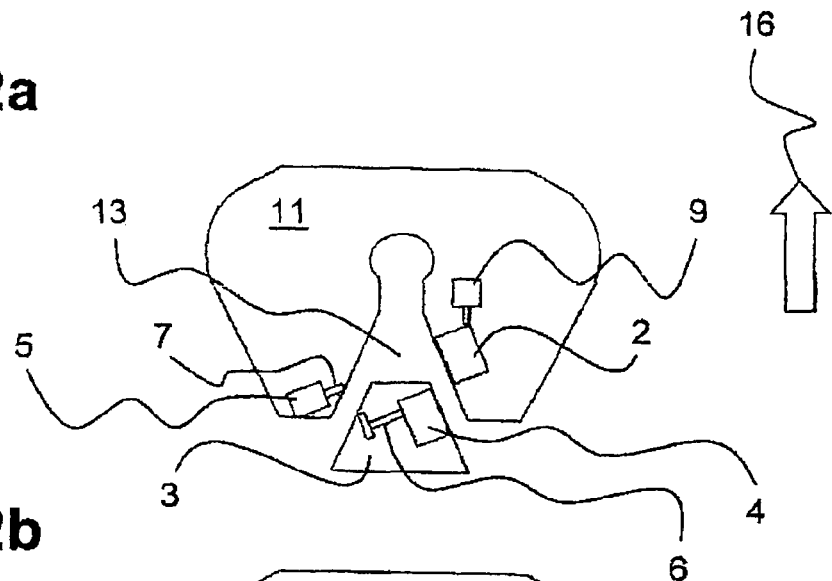
FIG. 2a: a schematic top view of a coupling system according to a second embodiment, arranged on a fifth wheel, before the trailer is coupled up.
Figure 2B:
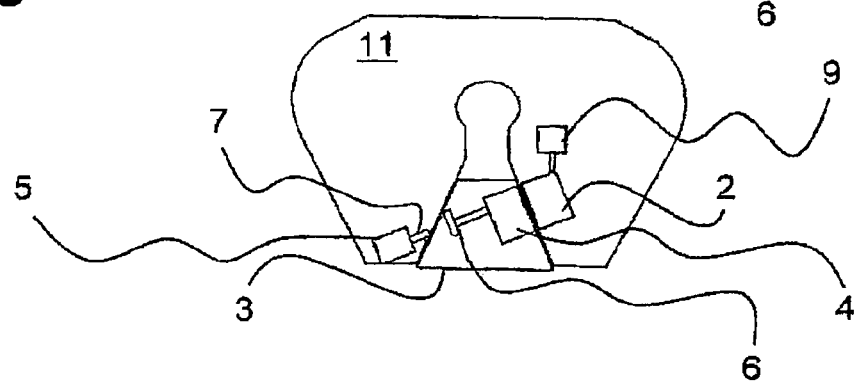
FIG. 2b: a view per FIG. 2a with trailer coupled up, before contacting the coupling system.
Figure 2C:
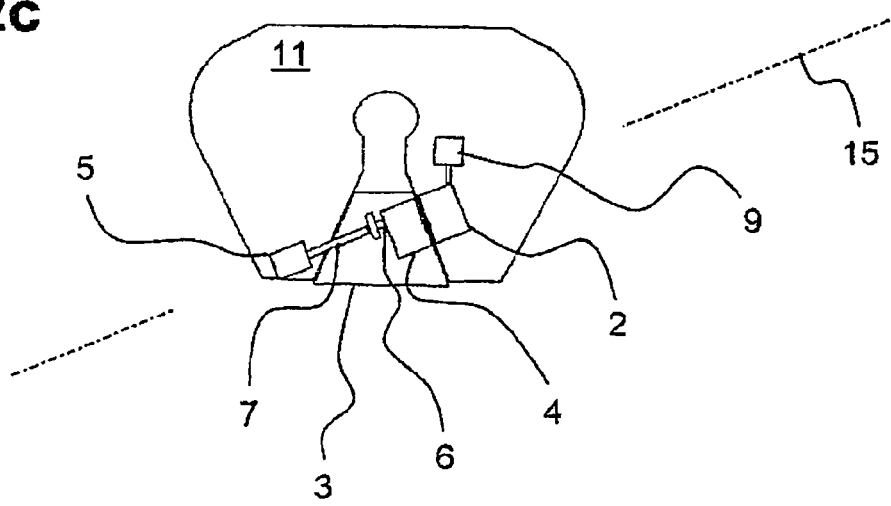
FIG. 2c: a view per FIGS. 2a and 2b with trailer coupled up, after contacting the coupling system.

FIGS. 2a and 2b show an alternative installation position of the coupling system on the fifth wheel 11 or the support element 3, in which the actuator 5, the ram 6 with the plug 4 and the socket 2 are arranged in an axis 15 (FIG. 2c) diagonally to the direction of travel 16. Here, the axis 15 is perpendicular to one wall of the entry opening 13 and the contacts of the socket 2 are likewise perpendicular to one of the opposite slanting walls of the entry opening 13. Since the shape of the support element 3 is complementary to the entry opening 13, the plug 4 also is arranged at the same angle relative to the direction of travel 16, corresponding to the socket 2. Hence, the actuator 5 is oriented at an incline to the direction of travel 16 and its pressure rod 7 can then make the plug 4 move through the support element 3.

LIST OF REFERENCE SYMBOLS

1 Supply lines
2 Socket
3 Support element
4 Plug
5 Actuator
6 Ram
7 Pressure rod
8 Locking element
9 Unlocking actuator
10 Spring element
11 Fifth wheel
12a,b Coupling horns
13 Entry opening
14 Kingpin
15 Axis
16 Direction of travel

What is claimed is:

1. A coupling system for connecting supply lines between a trailer and a tractor vehicle, comprising: a socket which is arranged on the tractor vehicle and a support element, having a plug, which is arranged on the trailer, wherein the socket is arranged on the tractor vehicle so as to remain in a fixed position relative to the tractor vehicle, at all times, independent of whether the tractor vehicle is coupled or uncoupled to the trailer, the plug is guided in a laterally moveable manner in the support element, and the plug can be placed into a connecting position with the socket by means of an actuator which is arranged on the tractor vehicle.

2. The system per claim 1, wherein a locking element is arranged on the plug or socket or both the plug and socket.

3. The system per claim 2, wherein the locking element interacts with an unlocking actuator.

4. The system per claim 3, wherein a spring element is arranged between the plug and the support element.

5. The system per claim 4, wherein the tractor vehicle has a fifth wheel with an entry opening formed by first and second lateral coupling horns and the trailer has a kingpin on which the support element is arranged to swivel, and wherein the socket is arranged in the first coupling horn.

6. The system per claim 5, wherein the actuator is arranged on the second coupling horn, opposite the first coupling horn.

7. The system per claim 6, wherein the actuator, the plug and the socket are oriented in a same axis relative to each other.

8. The system per claim 7, wherein the axis is oriented transversely or at a slant relative to a direction of travel of the tractor vehicle.

9. The system per claim 8, wherein the actuator, the plug and the socket are arranged in a same plane beneath the fifth wheel.

10. The system per claim 9, wherein a pressure rod of the actuator retracts back into an original position after being extended to produce the connection position by engaging a ram of the plug.

11. The system per claim 1, wherein the plug has a ram, with which a pressure rod of the actuator can engage.

12. The system per claim 11, wherein a locking element is arranged on the plug or socket or both the plug and socket.

13. The system per claim 1, wherein a spring element is arranged between the plug and the support element.

14. The system per claim 1, wherein the tractor vehicle has a fifth wheel with an entry opening formed by first and second lateral coupling horns and the trailer has a kingpin on which the support element is arranged to swivel, and wherein the socket is arranged in the first coupling horn.

15. The system per claim 14, wherein the actuator is arranged on the second coupling horn, opposite the first coupling horn.

16. The system per claim 14, wherein the actuator, the plug and the socket are arranged in a same plane beneath the fifth wheel.

17. The system per claim 1, wherein the actuator, the plug and the socket are oriented in a same axis relative to each other.

18. The system per claim 17, wherein the axis is oriented transversely or at a slant relative to a direction of travel of the tractor vehicle.

19. The system per claim 1, wherein a pressure rod of the actuator retracts back into an original position after being extended to produce producing the connection position by engaging a ram of the plug.

20. A coupling system for connecting supply lines between a trailer and a tractor vehicle, comprising: a socket which is arranged on the tractor vehicle and a support element, having a plug, which is arranged on the trailer, wherein the socket is arranged in a positionally fixed manner on the tractor vehicle, the plug is guided in a laterally moveable manner in the support element, and the plug can be placed into a connecting position with the socket by means of an actuator which is arranged on the tractor vehicle, and wherein the plug has a ram, with which a pressure rod of the actuator can engage.

21. A coupling system for connecting supply lines between a trailer and a tractor vehicle, comprising: a socket which is arranged on the tractor vehicle and a support element, having a plug, which is arranged on the trailer, wherein the socket is arranged in a positionally fixed manner on the tractor vehicle, the plug is guided in a laterally moveable manner in the support element, and the plug can be placed into a connecting position with the socket by means of an actuator which is arranged on the tractor vehicle, wherein the tractor vehicle has a fifth wheel with an entry opening formed by first and second lateral coupling, horns and the trailer has a kingpin on which the support element is arranged to swivel, and wherein the socket is arranged in the first coupling horn.

* * * * *